(12) United States Patent
Aurongzeb et al.

(10) Patent No.: US 10,345,488 B2
(45) Date of Patent: Jul. 9, 2019

(54) COVER GLASS COMPRISING ANTI-GLARE AND ANTI-REFLECTIVE COATING FOR REDUCING ADVERSE OPTICAL EFFECTS

(71) Applicant: DELL PRODUCTS L.P., Round Rock, TX (US)

(72) Inventors: Deeder M. Aurongzeb, Austin, TX (US); Xue Ming Lu, Shanghai (CN); Joseph Edward Jasinski, Austin, TX (US); Thomas Lanzoni, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 14/643,814

(22) Filed: Mar. 10, 2015

(65) Prior Publication Data
US 2016/0266279 A1 Sep. 15, 2016

(51) Int. Cl.
| G02B 1/111 | (2015.01) |
| C03C 17/34 | (2006.01) |
| G02B 5/02 | (2006.01) |
| G06F 1/16 | (2006.01) |

(52) U.S. Cl.
CPC ............ G02B 1/111 (2013.01); C03C 17/34 (2013.01); G02B 5/0226 (2013.01); G06F 1/1637 (2013.01); C03C 2217/478 (2013.01); C03C 2217/732 (2013.01)

(58) Field of Classification Search
CPC .......... G02B 1/11; G02B 1/111; G02B 1/113; G02B 1/115; G02B 1/118
USPC .................................................. 359/601, 609
See application file for complete search history.

(56) References Cited

U.S. PATENT DOCUMENTS

| 6,340,404 | B1* | 1/2002 | Oka | G02B 1/11 156/230 |
| 7,212,341 | B2* | 5/2007 | Ikeyama | B32B 7/02 359/582 |
| 7,924,362 | B2* | 4/2011 | Slobodin | G02F 1/133308 349/12 |
| 2005/0106333 | A1* | 5/2005 | Lehmann | G02B 1/111 428/1.6 |
| 2005/0196552 | A1* | 9/2005 | Lehmann | G02B 1/111 428/1.1 |
| 2006/0092495 | A1* | 5/2006 | Muramatsu | G02B 1/105 359/275 |
| 2007/0261601 | A1* | 11/2007 | Ikeda | B82Y 20/00 106/287.12 |
| 2009/0246415 | A1* | 10/2009 | Horie | G02B 1/11 428/1.3 |
| 2010/0187991 | A1* | 7/2010 | Kamei | G02B 5/0226 313/582 |
| 2010/0252202 | A1* | 10/2010 | Iwata | G02B 1/111 156/500 |
| 2011/0256312 | A1* | 10/2011 | Suzuki | G02B 1/118 427/164 |
| 2011/0317263 | A1* | 12/2011 | Yoneyama | B32B 3/20 359/487.06 |

(Continued)

*Primary Examiner* — Nicholas R. Pasko
(74) *Attorney, Agent, or Firm* — Baker Botts L.L.P.

(57) ABSTRACT

Adverse optical effects from a cover glass used to cover a display of an information handling system may be reduced at an imaging area that covers an imaging device, such as a video camera. An anti-reflective coating may be applied at the imaging area over an anti-glare coating to improve light transmission and contrast at the imaging device.

20 Claims, 4 Drawing Sheets

(56) References Cited

U.S. PATENT DOCUMENTS

| | | | |
|---|---|---|---|
| 2012/0105400 A1* | 5/2012 | Mathew | H04N 5/2251 345/207 |
| 2013/0273317 A1* | 10/2013 | Nakayama | G02B 1/11 428/141 |
| 2015/0316691 A1* | 11/2015 | Nakayama | C09D 133/24 428/148 |
| 2016/0357294 A1* | 12/2016 | Ozeki | C03C 15/00 |

* cited by examiner

COVER GLASS COMPRISING ANTI-GLARE AND ANTI-REFLECTIVE COATING FOR REDUCING ADVERSE OPTICAL EFFECTS

BACKGROUND

Field of the Disclosure

This disclosure relates generally to information handling systems and, more particularly, to improvement of adverse optical effects from anti-glare coatings.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery.

Many information handling systems, including portable devices, are equipped with a camera that is mounted behind a cover glass.

SUMMARY

In one aspect, a disclosed method is for manufacturing a cover glass for display devices of information handling systems. The method may include preparing a glass sheet for covering a display of an information handling system and for covering an imaging device included with the information handling system. The method may include applying an anti-glare coating at an external surface of the glass sheet. In the method, the external surface may include an imaging area that covers the imaging device. The method may further include applying an anti-reflective coating over the imaging area. In the method, the anti-reflective coating may improve light transmission of the cover glass.

Other disclosed aspects include an information handling system comprising a cover glass and a cover glass for an information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

As noted previously, elevated temperatures may lead to accelerated performance degradation for rechargeable batteries used in information handling systems. As will be described in further detail, the inventors of the present disclosure have developed methods and systems disclosed herein for improved battery performance under high temperature exposure.

Particular embodiments are best understood by reference to FIGS. 1, 2, 3, and 4 wherein like numbers are used to indicate like and corresponding parts.

Figure 1:
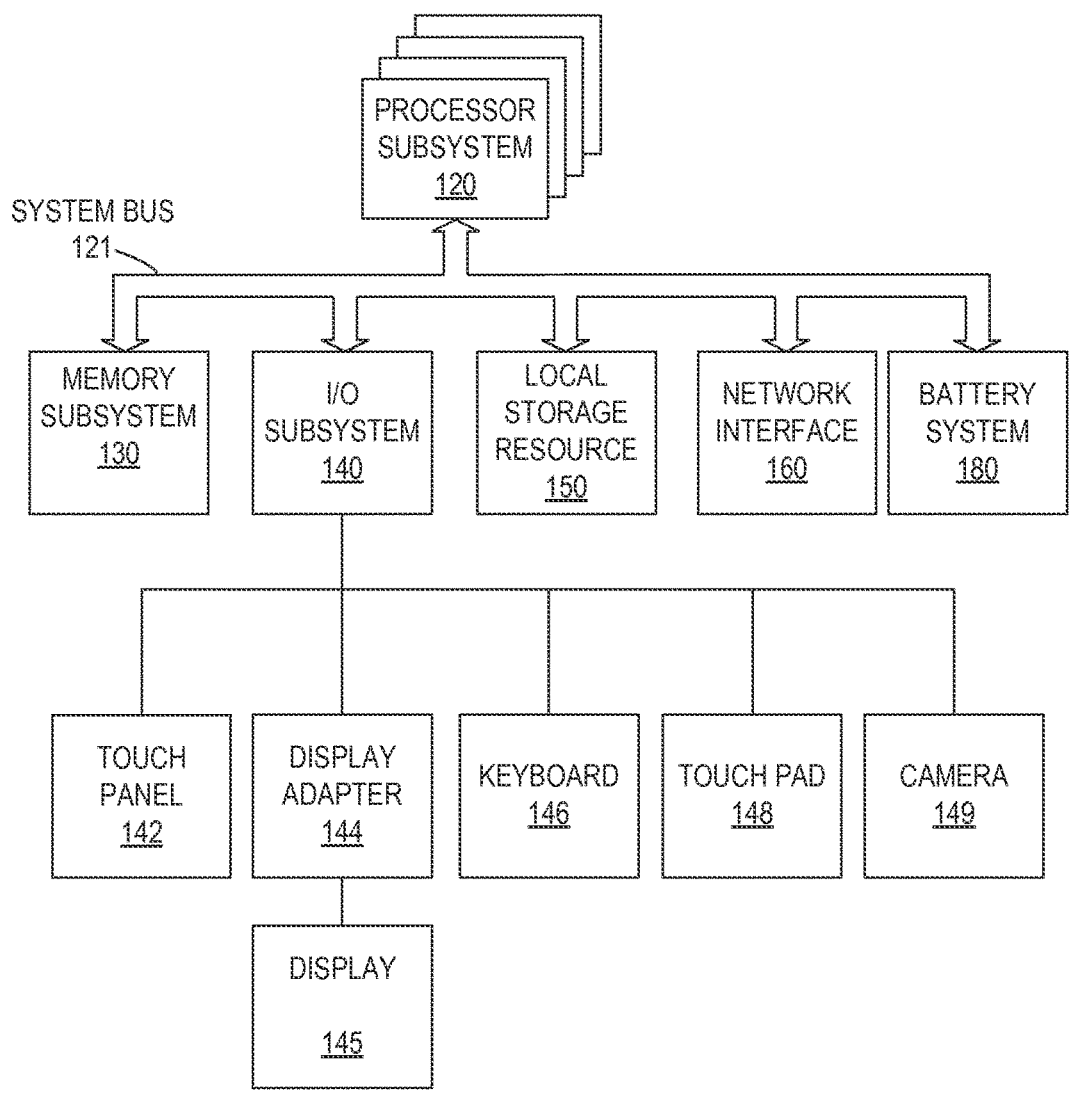
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or another component of physical hardware 102). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with display 145 that is driven by display adapter 144. Camera 149 may represent any of a variety of imaging devices, such as a video camera, infrared camera, or combinations thereof. Camera 149 may be included with display 145 behind a common cover glass, as will be described below.

In various embodiments of information handling system 100, such as portable devices or so-called all-in-one devices, display 145 may be mechanically integrated to other components. Furthermore, an imaging device, such as camera 149, may also be integrated with display 145 in such embodiments of information handling system 100. As a result of the integration, camera 149 and display 145 may share a common cover glass that covers and protects components from external exposure. The cover glass may be coated with an anti-glare coating (or film) at an external surface to reduce glare for a user viewing display 145. However, the anti-glare coating may have adverse optical affects for the image quality of camera 149, such as blurring of images captured by camera 149. Furthermore, camera 149 may be implemented using a variety of pixel sizes, such as (2.8 μm, 2.2 μm, 1.75 μm, and 1.4 μm), which may exhibit different kinds of sensitivity to the anti-glare coating. Removal of the cover glass at an imaging area corresponding to the location of camera 149 may not be a feasible solution due to reduction in mechanical stability of the cover glass that may result from any cutting or machining operation on the cover glass.

As will be described in further detail herein, the inventors of the present disclosure have discovered that selective application of an anti-reflective coating over the anti-glare coating at the imaging area may improve the adverse optical effects due to the anti-glare coating. The anti-reflective coating may have a relatively low index of refraction. The methods and materials disclosed herein may provide a suitable solution for different types of imaging devices while improving light transmission to the imaging device, and by improving contrast and image quality at the imaging device.

Figure 2:
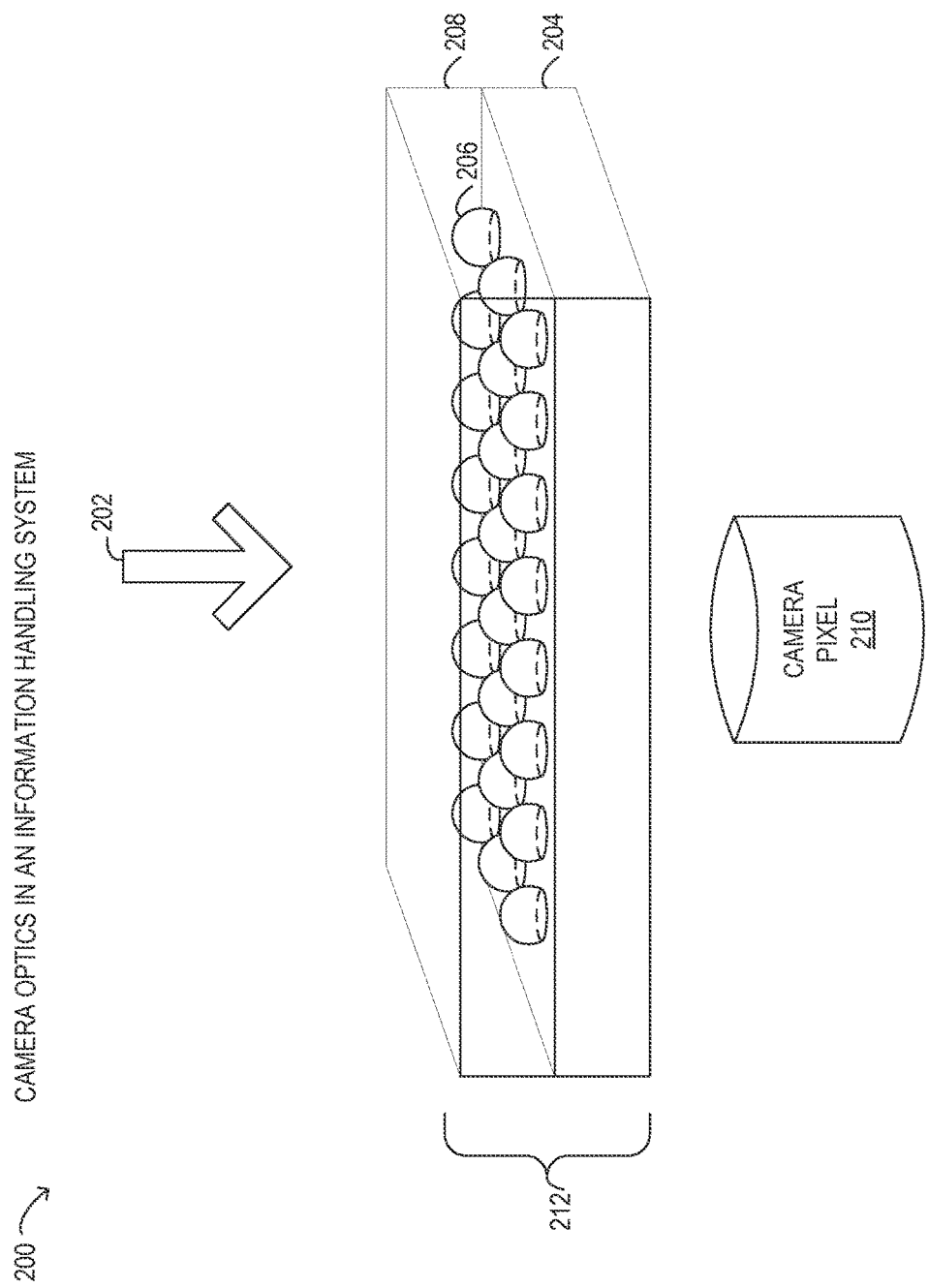
FIG. 2 is a block diagram of selected elements of an embodiment of camera optics in an information handling system.

Referring now to FIG. 2, selected elements of an embodiment of camera optics 200 in an information handling system are illustrated. FIG. 2 is a schematic illustration and is not drawn to scale. As shown, camera optics 200 illustrates a small section of the imaging area of a cover glass 212 that covers an imaging device, represented by camera pixel 210. Cover glass 212 may also cover a display device (not shown in FIG. 2). As shown, camera optics 200 include incident light 202, cover glass 212, and camera pixel 210. Camera pixel 210 may represent one of a plurality of camera pixels included in an imaging device.

As shown in FIG. 2, cover glass 212 may further include glass sheet 204, which may serve as a substrate for anti-glare coating 206. As shown, anti-glare coating 206 comprises discrete particles 206 that have been deposited on glass sheet 204. Particles 206 may scatter a certain amount of light to reduce a glare at an external surface of glass sheet. However, cover glass 212 further includes anti-reflective coating 208, which may cover or encapsulate anti-glare coating 206. As a result, anti-reflective coating 208 may alter optical properties of cover glass 212. Specifically, anti-reflective coating 208 may reduce scattering by anti-glare coating 206, thereby improving transmission of incident light 202 arriving at camera pixel 210. In various embodiments, the contrast or sharpness of an image acquired by camera pixel 210, among other camera pixels, when anti-reflective coating 208 is applied may also be improved.

The application of anti-reflective coating 208 at the imaging area associated with the imaging device may be particular suitable for manufacturing processes associated with information handling systems. Anti-reflective coating 208 may be selected based on a desired index of refraction to promote destructive interference of reflected light at interfaces in cover glass 212. In certain embodiments, anti-reflective coating 208 may be selected to have a relatively low index of refraction, such as an index of refraction that is lower than that of glass sheet 204 and anti-glare coating 206. As a result, the anti-glare properties of anti-glare coating 206 may be diminished, while improving transmission of incident light 202, which may improve contrast and clarity of images generated using camera pixel 210 (among other pixels in the imaging device). In given embodiments, anti-reflective coating 208 may be less than 500 nm thick.

As shown, anti-reflective coating 208 may be formed using a polymer film. The polymer file may be applied using a sol-gel process. Examples of suitable polymer films include polysulfonyl esters and hybrid carbonate-sulfones, among other materials known as bottom anti-reflective coatings (BARC). In other embodiments, a nanoporous film may be used for anti-reflective coating 208. An example of a nanoporous film is poly(methyl methacrylate) (PMMA), which may be spray- or injection-applied at the imaging area. Another example of a nanoporous film is polystyrene (PS). In given embodiments, the nanoporous film may exhibit a lattice structure with a spacing of about 100 nm. In certain instances, the film material, such as PMMA or PS, may be selectively removed in part using an etching process. Because the refractive index of the nanoporous film used for reflective coating 208 is directly related to porosity, different methods may be employed to control the porosity, such as varying a mixing fraction of the sacrificial PS particles. The nanoporous film may exhibit a reflectivity of about 0.05% in the visible spectral range, which may significantly improve image quality detected by camera pixel 210, among other camera pixels.

In a particular embodiment, a sol-gel precursor made of polyvinyl acetate and magnesium trifluoroacetate may be used to deposit a uniform mesoporous film of magnesium fluoride ($MgF_2$) as reflective coating 208 to improve the image quality or color gamut of the camera image. The thickness of the $MgF_2$ film used may be less than 100 nm or one-half of the surface roughness of glass sheet 204 and anti-glare coating 206.

In other embodiments, other techniques may be used to modify anti-glare coating 206 at the imaging area. For example, laser melting at the imaging area may be used to selectively modify or remove anti-glare coating 206, and thereby improve transmission properties of cover glass 212. Furthermore, image processing techniques may be applied to images generated by the imaging device to further improve clarity and sharpness, particularly when small amounts of blurring are observed.

Figure 3:
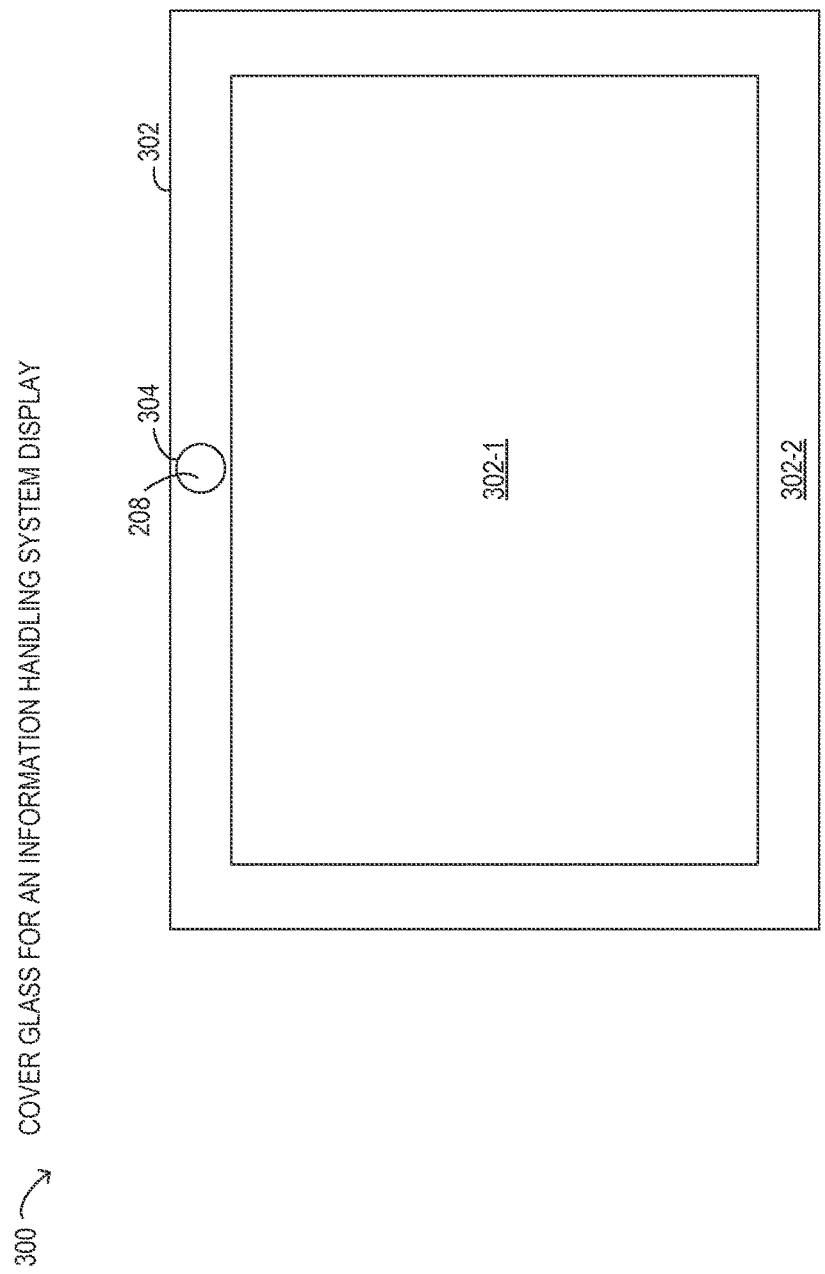
FIG. 3 is a block diagram of selected elements of an embodiment of a cover glass for an information handling system.

Referring now to FIG. 3, selected elements of an embodiment of cover glass 300 in an information handling system are illustrated. FIG. 3 is a schematic illustration and is not drawn to scale. As shown, cover glass 300 may represent an embodiment of cover glass 212 in FIG. 2. Cover glass 300 includes glass sheet 302, which may have an anti-glare coating at an external surface, which is not visible in FIG. 3. Cover glass 300 may have an interior region 302-1 that covers a display device. Cover glass 300 may have a bezel region 302-2 at a peripheral portion. Within bezel region 302-2, imaging area 304 may be a location that covers an imaging device, such as a video camera. As shown, anti-reflective coating 208 may be selectively applied to imaging area 304 to improve light transmission, as described previously.

Figure 4:
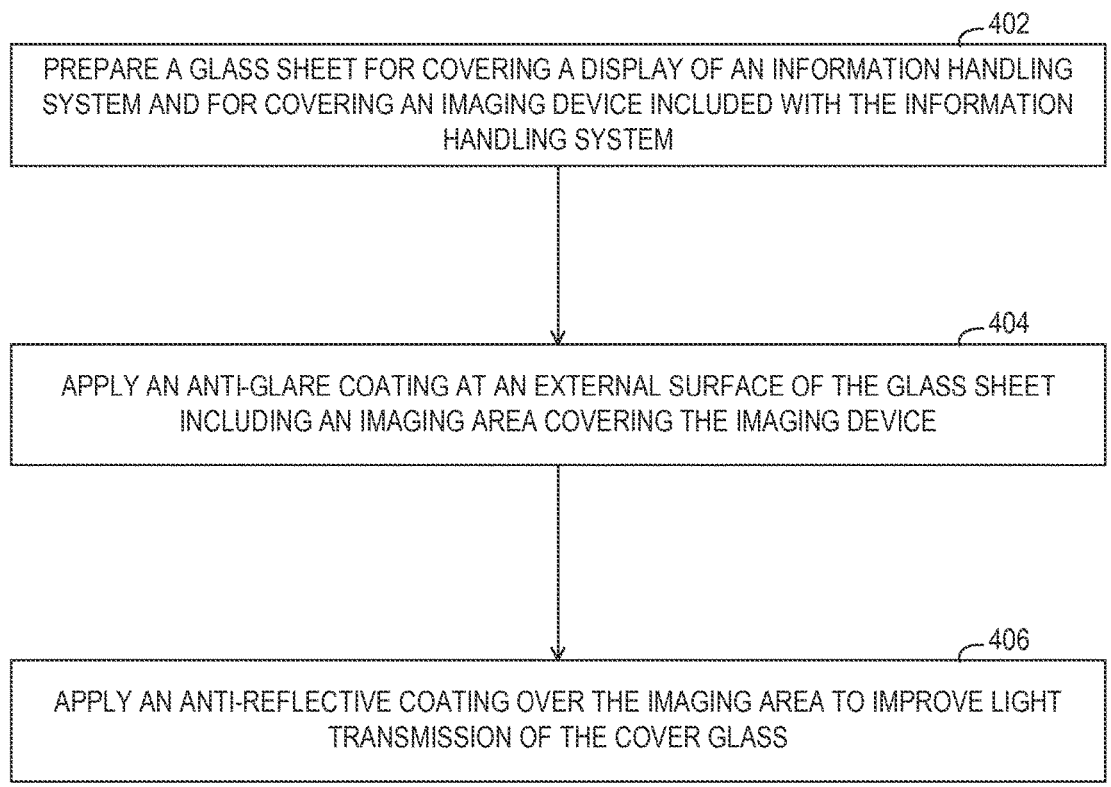
FIG. 4 is flowchart depicting selected elements of an embodiment of a method for manufacturing a cover glass.

Referring now to FIG. 4, a flow chart of selected elements of an embodiment of method 400 for manufacturing a cover glass, as described herein, is depicted. It is noted that certain operations described in method 400 may be optional or may be rearranged in different embodiments.

Method 400 may begin by preparing (operation 402) a glass sheet for covering a display of an information handling system and for covering an imaging device included with the information handling system. The glass sheet may comprise a suitable material, such as borosilicate glass or sapphire, among other materials that may be selected for a desired application. Then, an anti-glare coating is applied (operation 404) at an external surface of the glass sheet including an imaging area covering the imaging device. It is noted that the glass sheet may be cut to final size before or after operation 404. An anti-reflective coating is applied (operation 402) over the imaging area to improve light transmission of the cover glass.

As disclosed herein, adverse optical effects from a cover glass used to cover a display of an information handling system may be reduced at an imaging area that covers an imaging device, such as a video camera. An anti-reflective coating may be applied at the imaging area over an anti-glare coating to improve light transmission and contrast at the imaging device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A cover glass for information handling systems, comprising:
   a glass sheet shaped to cover a display of an information handling system and to cover an imaging device included with the information handling system;

an anti-glare coating applied on a top surface of the glass sheet including on an imaging area of the top surface and on an outer area of the top surface outside the imaging area, wherein the imaging area is shaped to cover the imaging device; and an anti-reflective coating applied only over the imaging area and the anti-glare coating applied on the imaging area of the top surface, wherein the anti-reflective coating improves light transmission of the cover glass.

2. The cover glass of claim 1, wherein the anti-reflective coating comprises a polymer coating including at least one of a polysulfonyl ester and a hybrid carbonate-sulfone.

3. The cover glass of claim 1, wherein the anti-reflective coating comprises a nanoporous coating having a pore size smaller than wavelengths of visible light.

4. The cover glass of claim 1, wherein a first index of refraction of the anti-reflective coating is smaller than a second index of refraction of the glass sheet combined with the anti-glare coating.

5. The cover glass of claim 1, wherein the anti-reflective coating is less than 500 nanometers thick, and wherein the anti-reflective coating to improve contrast at the imaging device when the glass sheet covers the imaging device.

6. The cover glass of claim 1, wherein the anti-glare coating comprises silica particles.

7. A method for manufacturing a cover glass for display devices of information handling systems, the method comprising:

preparing a glass sheet shaped to cover a display of an information handling system and to cover an imaging device included with the information handling system;

applying an anti-glare coating applied on a top surface of the glass sheet including on an imaging area of the top surface and on an outer area of the top surface outside the imaging area, wherein the imaging area is shaped to cover the imaging device; and applying an anti-reflective coating only over the imaging area and the anti-glare coating on the imaging area of the top surface, wherein the anti-reflective coating improves light transmission of the cover glass.

8. The method of claim 7, wherein the anti-reflective coating comprises a polymer coating including at least one of a polysulfonyl ester and a hybrid carbonate-sulfone.

9. The method of claim 7, wherein the anti-reflective coating comprises a nanoporous coating having a pore size smaller than wavelengths of visible light.

10. The method of claim 7, wherein a first index of refraction of the anti-reflective coating is smaller than a second index of refraction of the glass sheet combined with the anti-glare coating.

11. The method of claim 7, wherein the anti-reflective coating is less than 500 nanometers thick, and wherein the anti-reflective coating to improve contrast at the imaging device when the glass sheet covers the imaging device.

12. The method of claim 7, wherein the anti-glare coating comprises silica particles.

13. The method of claim 7, wherein applying the anti-reflective coating includes using a sol-gel process to apply the anti-reflective coating.

14. An information handling system comprising:

a display having a cover glass;

an imaging device covered by the cover glass at an imaging area, wherein the imaging device includes a plurality of camera pixels that receive light through the cover glass, wherein the cover glass further comprises:

a glass sheet;

an anti-glare coating applied on a top surface of the glass sheet including on the imaging area of the top surface and on an outer area of the top surface outside the imaging area; and an anti-reflective coating applied only over the imaging area and the anti-glare coating applied on the imaging area of the top surface, wherein the anti-reflective coating improves light transmission of the cover glass.

15. The information handling system of claim 14, wherein the anti-reflective coating comprises a polymer coating including at least one of a polysulfonyl ester and a hybrid carbonate-sulfone.

16. The information handling system of claim 14, wherein the anti-reflective coating comprises a nanoporous coating having a pore size smaller than wavelengths of visible light.

17. The information handling system of claim 14, wherein a first index of refraction of the anti-reflective coating is smaller than a second index of refraction of the glass sheet combined with the anti-glare coating.

18. The information handling system of claim 14, wherein the anti-reflective coating is less than 500 nanometers thick, and wherein the anti-reflective coating improves contrast at the imaging device.

19. The information handling system of claim 14, wherein the anti-glare coating comprises silica particles.

20. The information handling system of claim 14, wherein the information handling system is a portable information handling system.

* * * * *